United States Patent [19]

Geoffrey

[11] Patent Number: 4,542,939
[45] Date of Patent: Sep. 24, 1985

[54] SEAT BELT POSITIONING DEVICE
[75] Inventor: James E. Geoffrey, Livonia, Mich.
[73] Assignee: Ford Motor Company, Dearborn, Mich.
[21] Appl. No.: 444,244
[22] PCT Filed: Sep. 30, 1982
[86] PCT No.: PCT/US82/01366
   § 371 Date: Sep. 30, 1982
   § 102(e) Date: Sep. 30, 1982
[87] PCT Pub. No.: WO84/01299
   PCT Pub. Date: Apr. 12, 1984
[51] Int. Cl.[4] .............................................. B60R 21/00
[52] U.S. Cl. .................................... 297/481; 297/468; 297/475; 297/482
[58] Field of Search ............... 297/482, 481, 475, 468; 280/801, 807, 808

[56] References Cited
U.S. PATENT DOCUMENTS

| 3,279,851 | 10/1966 | Hinchcliff | 297/481 |
| 3,287,063 | 11/1966 | Nicholas | 297/482 |
| 4,118,068 | 10/1978 | Fohl | 297/481 |
| 4,133,556 | 1/1979 | Glinski | 280/801 |
| 4,372,613 | 2/1983 | Kitakami et al. | 297/481 |
| 4,400,015 | 8/1983 | Ryu | 297/481 |
| 4,431,233 | 2/1984 | Ernst | 297/482 |

Primary Examiner—James T. McCall
Attorney, Agent, or Firm—Daniel M. Stock; Clifford L. Sadler

[57] ABSTRACT

A seat belt positioning device (14) is provided which includes a boot member (32) consisting of a housing member (31) covering a spring loaded retractor mechanism (20) for the seat belt (26) and a guide member (34) for guiding the belt (26). The housing member (31) and guide member (34) are connected through a hinge (42, 44) for pivotal movement about an axis displaced below the path of protraction and retraction of the belt (26) so that full retraction of the belt (26) operates to pivot the guide housing (34) vertically to an occupant accessible position when mounted in a vehicle.

4 Claims, 3 Drawing Figures

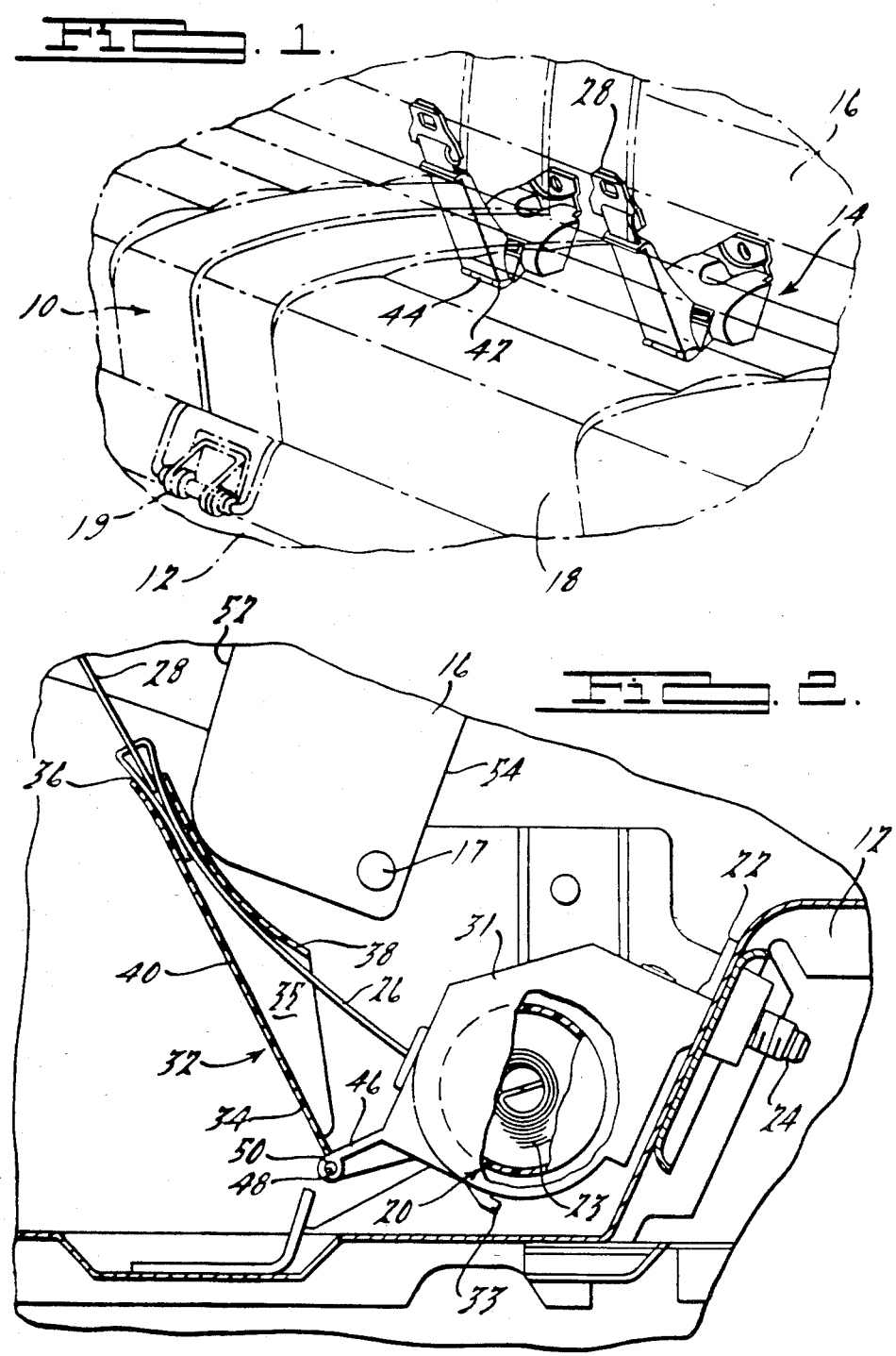

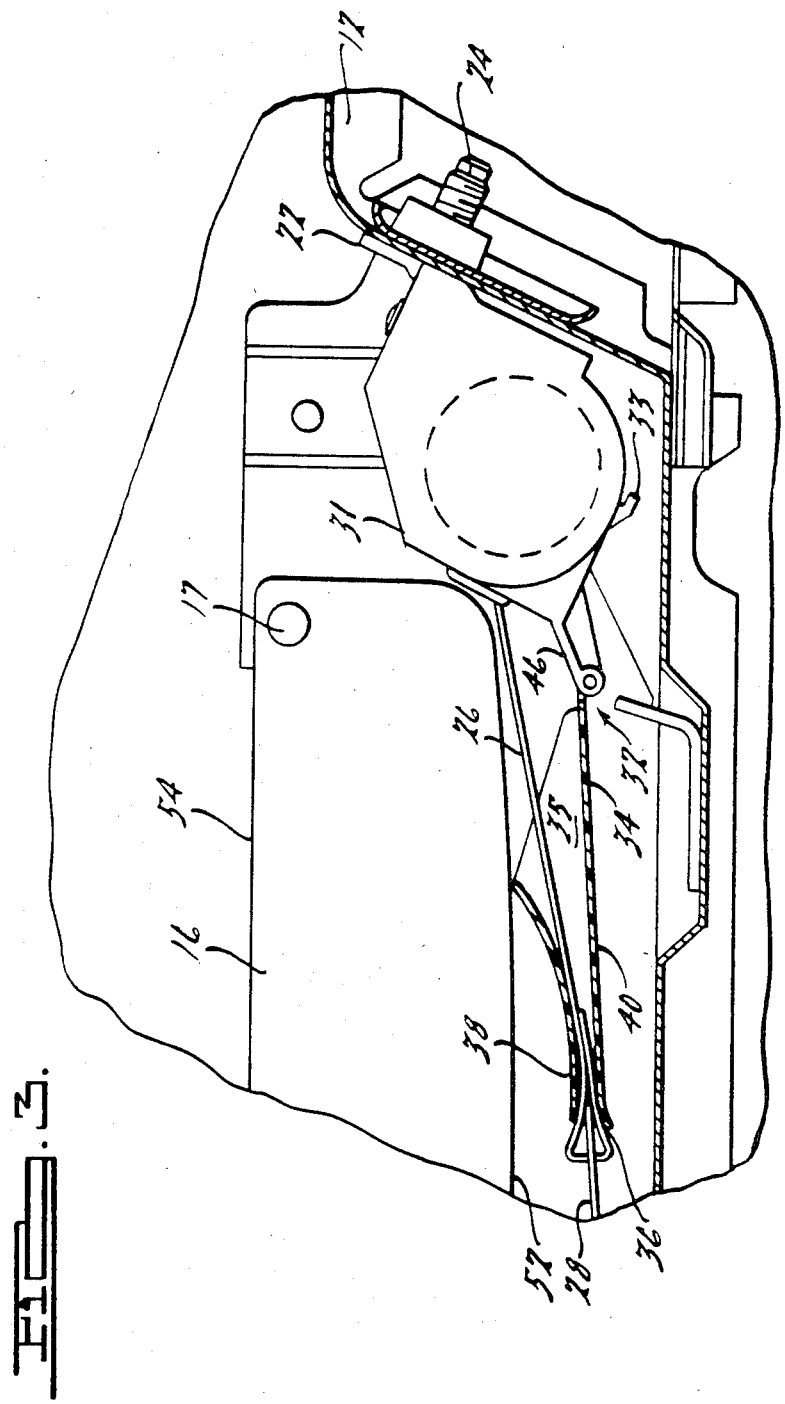

SEAT BELT POSITIONING DEVICE

TECHNICAL FIELD

The present invention relates generally to vehicle seat belt systems and more specifically to a seat belt positioning device for maintaining a seat belt in a position accessible to vehicle occupants in a vehicle in which a seat back moves pivotally from a seating position to a load floor position.

BACKGROUND ART

In vehicles in which a seat is employed which provides for pivotal movement of the seat back between an upright position for seating and a substantially horizontal position for defining a load floor, it has been found that when, as is customary, seat belt components are inserted in the space between the seat cushion portion of the seat and the pivotally mounted seat back, those seat belt portions are urged toward the horizontal position during forward pivotal movement of the seat back and some means must be provided for repositioning for ready occupant access to the components when the seat back is in the upright position. When it is the seat buckle component that is positioned between the seat back and the cushion, auxiliary spring members have been employed to load the component carrying the seat belt buckle toward the upright position. Exemplary of such systems is that disclosed in U.S. Pat. No. 4,133,556 to Glinski. The position of the belt carrying components of seat belt assemblies has also been effected by the use of auxiliary spring-like members such as that disclosed in U.S. Pat. No. 3,279,851 to Hinchcliff. In vehicles utilizing seats of the type described above, however, the most common practice in repositioning seat belt components in which the seat belt is carried has been to require manual repositioning of the seat belts by occupants upon returning the pivotally mounted seat back to the upright position.

DISCLOSURE OF THE INVENTION

Responsive to the deficiencies in the prior art, the present invention provides a seat belt positioning device which operates to urge the seat belt carrying component of the seat belt assembly toward an upright position by normal operation of the retracting mechanism of the seat belt without the use of any auxiliary spring mechanisms.

In accordance with this invention, a positioning device is provided which includes a flexible boot member which guides the travel of the seat belt between the pivotally mounted seat back and the seat cushion of the vehicle and includes a hinge positioned below the plane of travel of the seat belt and a guide aperture which limits the retracting movement of the seat belt in cooperation with the enlarged latch member on the free end of the seat belt such that upon certain retracting movement of the seat belt, the latch member engages the end of the boot and urges the boot member pivotally against a frontal surface of the seat back.

BRIEF DESCRIPTION OF THE DRAWINGS

FIG. 1 is a perspective view of a portion of a motor vehicle body including a seat adjacent which the seat belt positioning device of the present invention is installed (certain portions broken away for clarity);

FIG. 2 is a cross sectional view of the seat belt positioning device of the present invention in the position assumed when the vehicle seat back is in the upright position; and FIG. 3 is a cross section view similar to FIG. 2 wherein the vehicle seat back is in the load floor position.

BEST MODE FOR CARRYING OUT THE INVENTION

Referring now to the drawings and in particular to FIG. 1, a vehicle seat 10 is illustrated as being installed in the body 12 of a motor vehicle. A seat belt positioning device 14 according to the present invention is illustrated as being installed on the body 12 of the vehicle in a position adjacent the seat 10 and having a portion inserted through the interspace between the seat back 16 and the seat cushion 18.

Turning now to FIGS. 2 and 3, the seat belt positioning device 14 is illustrated as including a retractor assembly shown diagrammatically at 20. The retractor assembly 20 includes a body 22 which is secured to a portion of the vehicle body 12 as by conventional fasteners such as that illustrated at 24. The constructional details of the retractor assembly 20 form no part of the present invention and any of the commonly available retractor assemblies may be chosen which include a spring-loaded spool means such as that shown diagramatically at 23 for controlling the protraction and retraction of a belt 26.

The belt 26 preferably includes a latch member 28 which may be secured to the belt 26 by means of a loop 30 formed of the belt material. The latch member 28 is configured to be secured in a buckle member (not shown) on the opposite side of the seat cushion 18 from which the positioning device 14 protrudes.

Further included in the positioning device 14 of the present invention is a novel boot member 32 which is preferably formed as a pair of hollow flexible members formed from plastic. One member is a retractor cover member 31 secured as by tab 33 over the housing 22 of retractor assembly 20. The other is a guide member 34 which defines a cavity 35 for receiving the belt 26. A slot-like aperture 36 sized to prevent inward passage of the latch member 28 is formed at the end of the boot guide member 34 remote from the retractor assembly 20. Upper and lower walls 38 and 40, respectively, of the boot guide member 34 converge to the end in which the aperture 36 is formed and a hinge half 42 as may best be seen in FIG. 1 is preferably formed at the inner most end of the lower surface 40. Another hinge half 44 is formed at the free end of a depending leg 46 of retractor cover member 31. Aligned apertures 48 in the hinge halves 42, 44 receive a hinge pin 50 to define an axis for pivotal movement of the guide member 34.

OPERATION OF THE DISCLOSED EMBODIMENT

As can be seen in FIGS. 2 and 3, the seat back 16 is pivotally mounted as indicated at 17 and is positioned for normal seating use as shown in FIG. 2 with the upper surface 38 of the boot member 32 in abutting engagement with a frontal surface 52 of the seat back 16.

Upon tilting the seat back 16 forward to the position shown in FIG. 3 in which the back surface 54 of the seat back 16 may serve as a load floor after the seat cushion portion 18 of the seat 10 has been moved out of the way by pivoting about the hinges 19 as seen in FIG. 1 or other means, the boot member 32 is urged counterclockwise as viewed in FIG. 3 to a substantially horizontal position beneath the seat back 16.

The length of the seat belt 26 is controlled such that the latch member 28 rests against the free edge of the boot guide member 34 when the belt 26 is fully retracted in the seating position of FIG. 2. Therefore, upon pivoting the seat back 16 from the position of FIG. 2 to the position of FIG. 3, limited protraction of the belt 26 takes place because the hinge 42, 44 defines a pivotal axis displaced downwardly from the plane of travel of the belt 26.

Upon returning the seat back 16 to the upright position, the normal spring mechanism of the retractor assembly 20, which is operative to retract the belt 26, operates on the boot due to the abutment of the latch member 28 at the periphery of the aperture 36 to pivot the boot clockwise to follow the travel of the seat back 16 and substantially maintain the abutting relationship between the frontal surface 52 of the seat back and the upper surface 38 of the boot member, thereby maintaining the latch 28 in a position for ready access by the vehicle occupants whenever the seat back 16 is in the upright position.

INDUSTRIAL APPLICABILITY

The seat belt positioning device of the present invention assists in maintaining the seat belt in a vehicle occupant accessible position in vehicles in which the seat back may be pivoted to a position in which portions of the seat belt would be urged to a less accessible position.

What is claimed is:

1. A seat belt positioning device for a motor vehicle body characterized in that said positioning device comprises:
   (A) a seat belt;
   (B) a retractor assembly secured to the body and including rotatably mounted spool means for mounting one end of said belt for protraction and retraction and spring means biasing said belt for retraction;
   (C) boot means defining an aperture for guidingly receiving said belt, said boot means having a housing mounted for pivotal movement with respect to the body between a substantially vertical position and a substantially horizontal position;
   (D) means defining an enlarged portion of said belt proximate the free end thereof to prevent said enlarged portion passing through said boot aperture; and
   (E) means defining a hinge in said boot means housing having a pivotal axis displaced from the plane of protraction and retraction of said belt whereby upon certain retraction of said belt said enlarged belt portion engages said boot housing and said boot means is urged toward said vertical position under the influence of said retractor assembly spring means.

2. A seat belt positioning device for a motor vehicle body having a seat back pivotally mounted at the rear of the seat for tiltable forward movement between a substantially vertical seating position and a substantially horizontal load position, characterized in that the seat belt positioning device comprises:
   (A) a seat belt having a locking member secured to the free end thereof;
   (B) a retractor assembly having a housing and means carried by said housing for mounting the other end of said belt for protraction and retraction of the belt and spring means biasing said belt for retraction, said retractor assembly being mounted in said vehicle body adjacent the seat back;
   (C) boot means secured at one end to said retractor assembly in surrounding relationship with respect to said belt and including
      (1) hinge means proximate said one end for permitting pivotal movement of portions of said boot means between positions abutting a frontal surface of the seat back in the seat back seating and load positions; and
      (2) means defining a guide aperture in said boot means at the free end thereof for guiding movement of said seat belt, said guide aperture being sized to prevent passage during retracting movement of said belt locking member, thereby effecting pivotal urging of said boot means portions against said seat back frontal surface under the influence of said retractor assembly spring means.

3. A seat belt positioning device as defined in claim 1 or 2 wherein said hinge means defines a pivotal axis displaced downwardly from the plane of protracting and retracting of said seat belt.

4. A seat belt positioning device for a motor vehicle body having a seat back pivotally mounted at the rear of the seat for tiltable forward movement between a substantially horizontal load position, characterized in that the seat belt positioning device comprises:
   (A) a seat belt having a locking member secured to the free end thereof;
   (B) a retractor assembly having a housing and means carried by said housing for mounting the other end of said belt for protraction and retraction of the belt and spring means biasing said belt for retraction, said retractor assembly being mounted in said vehicle body adjacent the seat back; and
   (C) boot means having:
      (1) a cover member secured over said retractor assembly and including a leg portion extending generally downwardly therefrom and toward the front of the seat back;
      (2) a guide housing member carried in surrounding relationship about said belt and including means defining a guide aperture at one end thereof for guiding movement of said belt, said aperture being sized to prevent passage of said belt locking member; and
      (3) hinge means disposed intermediate a lower surface of said guide housing member and said leg portion to define a pivotal axis displaced downwardly from the plane of travel of said belt.

* * * * *